Nov. 29, 1932.　　　　J. C. BOWEN　　　　1,888,977
MILK DRAINING TUBE
Filed March 16, 1931
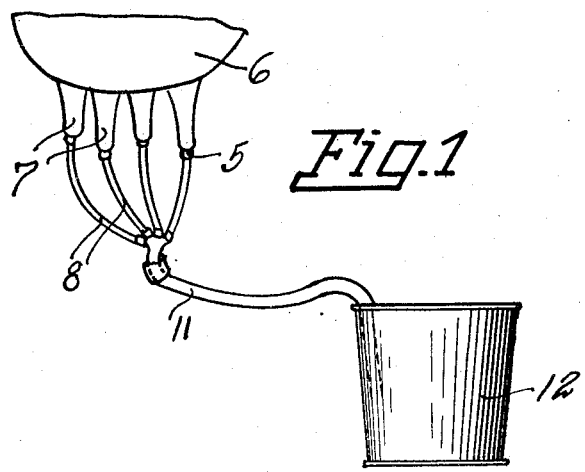
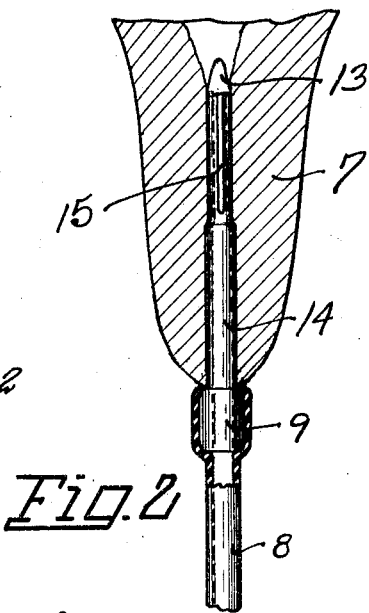
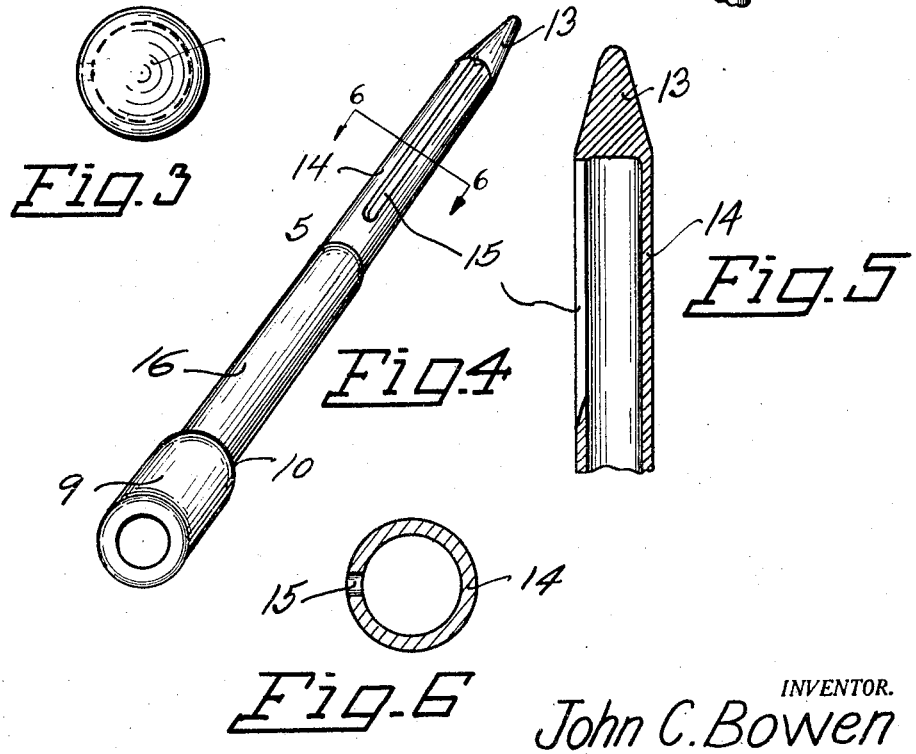
INVENTOR.
John C. Bowen
BY
Glenn L. Fisk
ATTORNEY.

Patented Nov. 29, 1932

1,888,977

UNITED STATES PATENT OFFICE

JOHN C. BOWEN, OF HUNTERS, WASHINGTON

MILK DRAINING TUBE

Application filed March 16, 1931. Serial No. 522,826.

My invention relates to milk draining tubes that are adapted for use in removing the milk from the udder by gravity. And certain objects of the invention are to provide a tube that when inserted into the teat the milk will freely flow through a slot therein. Further objects are to provide a tube having a solid tapered point, that when inserted will eliminate the irritation of the tender tissues. Other objects are to provide enlarged lower portions that will increase the holding qualities of the tube within the teat.

With the above and other objects in view, which will appear as the description proceeds, the invention consists of the novel construction, adaptation, combination and arrangement of the parts hereinafter described and claimed. These objects are accomplished by devices illustrated in the accompanying drawing wherein:—

Figure 1 is a view showing the cluster arrangement of the complete system.

Figure 2 is a view showing the tube inserted into the teat.

Figure 3 is a plan view of the tube.

Figure 4 is a view in perspective, showing the complete tube.

Figure 5 is a view of the enlarged cross sectional portion of the tube.

Figure 6 is a view in cross section taken on line 6, 6 of Figure 4.

Referring to the drawing throughout which like reference numerals designate the like parts in the several views. My invention comprises a tube 5 which is used to drain the milk from the udder 6. This is accomplished by inserting the tube into the teat 7. A tube 5 is inserted into each teat and is provided with a rubber tube 8 on its lower enlarged end 9. The enlarged portion 9 prevents the rubber tube from being easily removed, and also provides a stop 10 which regulates the distance the tube can be inserted into the teat. The tubes 8 are connected to the single outlet 11 through which the milk is conveyed into the milk container 12. The tube 5 is constructed of light material having a solid tapered point 13 which is integral with the tube and acts as a strengthening member for the tube. The tapered point also offers very little resistance when inserting, thus preventing the tissues from being torn within the teat.

The cylinder portion of the tube 14 is provided with a narrow slot 15 through which the milk drains by gravity into the container. The end of said slot farthest from the tapered point 13 is slanted or beveled inwardly and downwardly in a direction toward said tapered point for the purpose of preventing any tearing of the tissues when the tube is inserted into the teat. The tube portion 16 is slightly larger than the portion 14, and acts as a complete seal to the teat. The lower end of the tube is provided with an enlarged head 9, and when inserted into the teat acts as a stop. It will now be apparent that I have provided a stronger tube, that when inserted into the cow's teat will drain the milk from the udder by gravity, a tube that will not injure the most delicate muscular tissue, and the enlarged lower portion of which provides a means for the milk to flow more freely. The tube is a stronger, simpler, and comparatively inexpensive draining tube which is effective in its operation. Having thus described my invention it being understood that minor changes in its construction and arrangement may be made without departing from the scope and spirit of the invention.

What I claim and desire to secure by Letters Patent of the United States is:

A milk draining tube comprising a tubular body adapted to be inserted into a cow's teat, a solid tapered point integral with said body, an enlarged end for said body forming a shoulder therewith which shoulder limits the entry of the tube into a cow's teat, the half portion of the tubular body adjacent the tapered point being slightly reduced, a slot extending the greater length of said reduced tubular portion, and the end of said slot farthest from the tapered point slanting inwardly and downwardly toward said tapered point.

In testimony whereof I affix my signature.

JOHN C. BOWEN.